(12) United States Patent
Milan et al.

(10) Patent No.: US 7,424,560 B2
(45) Date of Patent: *Sep. 9, 2008

(54) UNIVERSAL SERIAL BUS HUB WITH WIRELESS COMMUNICATION TO REMOTE PERIPHERAL DEVICES

(76) Inventors: Henry Milan, 1709 Apple Ridge Ct., Rochester Hills, MI (US) 48306; Rodney Haas, 999/181 Soi 23, Sri Charoen Villa, Theparak Road, 5 KM, North Samrong, Samut Prakarn, Bangkok (TH) 10270

( * ) Notice: Subject to any disclaimer, the term of this patent is extended or adjusted under 35 U.S.C. 154(b) by 0 days.

This patent is subject to a terminal disclaimer.

(21) Appl. No.: 11/337,148

(22) Filed: Jan. 20, 2006

(65) Prior Publication Data

US 2006/0117127 A1 Jun. 1, 2006

Related U.S. Application Data

(63) Continuation of application No. 09/632,466, filed on Aug. 4, 2000, now Pat. No. 7,028,114.

(60) Provisional application No. 60/174,442, filed on Aug. 11, 1999.

(51) Int. Cl.
*G06F 13/00* (2006.01)

(52) U.S. Cl. .................................. 710/100; 455/226
(58) Field of Classification Search ............... 710/55, 710/100; 370/421, 468; 455/226
See application file for complete search history.

(56) References Cited

U.S. PATENT DOCUMENTS

| 5,870,080 A | 2/1999 | Burnett |
| 5,890,015 A | 3/1999 | Garney et al. |
| 6,408,351 B1 | 6/2002 | Hamdi et al. |
| 6,519,290 B1 | 2/2003 | Green |
| 6,778,519 B1 * | 8/2004 | Harrell et al. ............... 370/342 |
| 2001/0014102 A1 * | 8/2001 | Mattingly et al. ........... 370/421 |
| 2003/0043771 A1 | 3/2003 | Mizutani et al. |

* cited by examiner

*Primary Examiner*—Mark H. Rinehart
*Assistant Examiner*—Kim T. Huynh

(57) ABSTRACT

A wireless USB hub for connecting a plurality of remote peripheral devices to a computer for communication therewith without the need to physically connect the peripheral devices to the hub via a cable connection. The wireless USB hub includes a receiver for receiving wireless data transmissions from one or more remote peripheral devices. The wireless USB hub further includes a hub controller for passing appropriate peripheral device information to a USB upstream port and then to a computer.

11 Claims, 14 Drawing Sheets

UNIVERSAL SERIAL BUS HUB WITH WIRELESS COMMUNICATION TO REMOTE PERIPHERAL DEVICES

RELATED APPLICATION

This application is a continuation of U.S. patent application Ser. No. 09/632,466 filed Aug. 4, 2000, now U.S. Pat. No. 7,028,114 issued Apr. 11, 2006, which claims the benefit of U.S. Provisional Patent Application Ser. No. 60/148,442 filed Aug. 11, 1999. The provisional application, Ser. No. 60/148,442, is hereby incorporated by reference in its entirety.

BACKGROUND OF THE INVENTION

The present invention relates to a wireless data input device and more particularly to a Universal Serial Bus (hereinafter USB) hub having wireless data communication with remote wireless peripheral devices.

A personal computer system comprises a computer, a display such as a CRT or flat panel display, and other peripheral devices communicating with the computer for entering data, printing data or controlling the computer. The peripheral devices require a connection to the computer which will enable them to communicate with the computer. Typically, most peripheral devices communicate with the computer over a connection cable.

Wireless communication between the computer and peripheral devices without a cable connection therebetween is known. Typical wireless systems replace the connection cable with radio frequency signals, ultrasonic signals or infrared light signals to enable the remote peripheral wireless devices to communicate with the computer.

The USB hub provides a convenient central data connection point for attaching multiple peripheral devices to a computer. The hub relays data from the computer to all enabled devices coupled to the data hub, and relays data from the enabled devices to the computer. This data relay is performed without any data storage or significant delay. The USB hub is connected to the computer via a single USB upstream connector. The USB hub also includes a plurality of downstream ports for connecting the peripheral devices to the hub. The USB hub uses a standardized connector at the downstream ports to provide universal connectivity between peripheral devices and the computer. USB hubs currently require peripheral devices to be physically connected to the hub using cable connectors. It is desirable to provide a USB hub with capability to communicate with a plurality of remote wireless peripheral devices without the need to physically connect the peripheral devices to the hub with a cable connection.

SUMMARY OF THE INVENTION

The invention relates to a wireless USB hub for connecting a plurality of remote wireless peripheral devices to a computer for communication therewith without the need to physically connect the peripheral devices to the hub via a cable connection. The wireless USB hub includes a receiver for receiving wireless data transmissions from at least one remote wireless peripheral device. A signal discriminator determines what peripheral device sent the data and passes the appropriate information to a USB hub controller. The hub controller communicates via a USB transceiver to an upstream port and to the computer via a cable and connector.

BRIEF DESCRIPTION OF THE DRAWINGS

The advantages of the invention will become readily apparent to those skilled in the art from the following detailed description of a preferred embodiment when considered in the light of the accompanying drawings, in which.

DETAILED DESCRIPTION OF THE PREFERRED EMBODIMENTS

It is to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
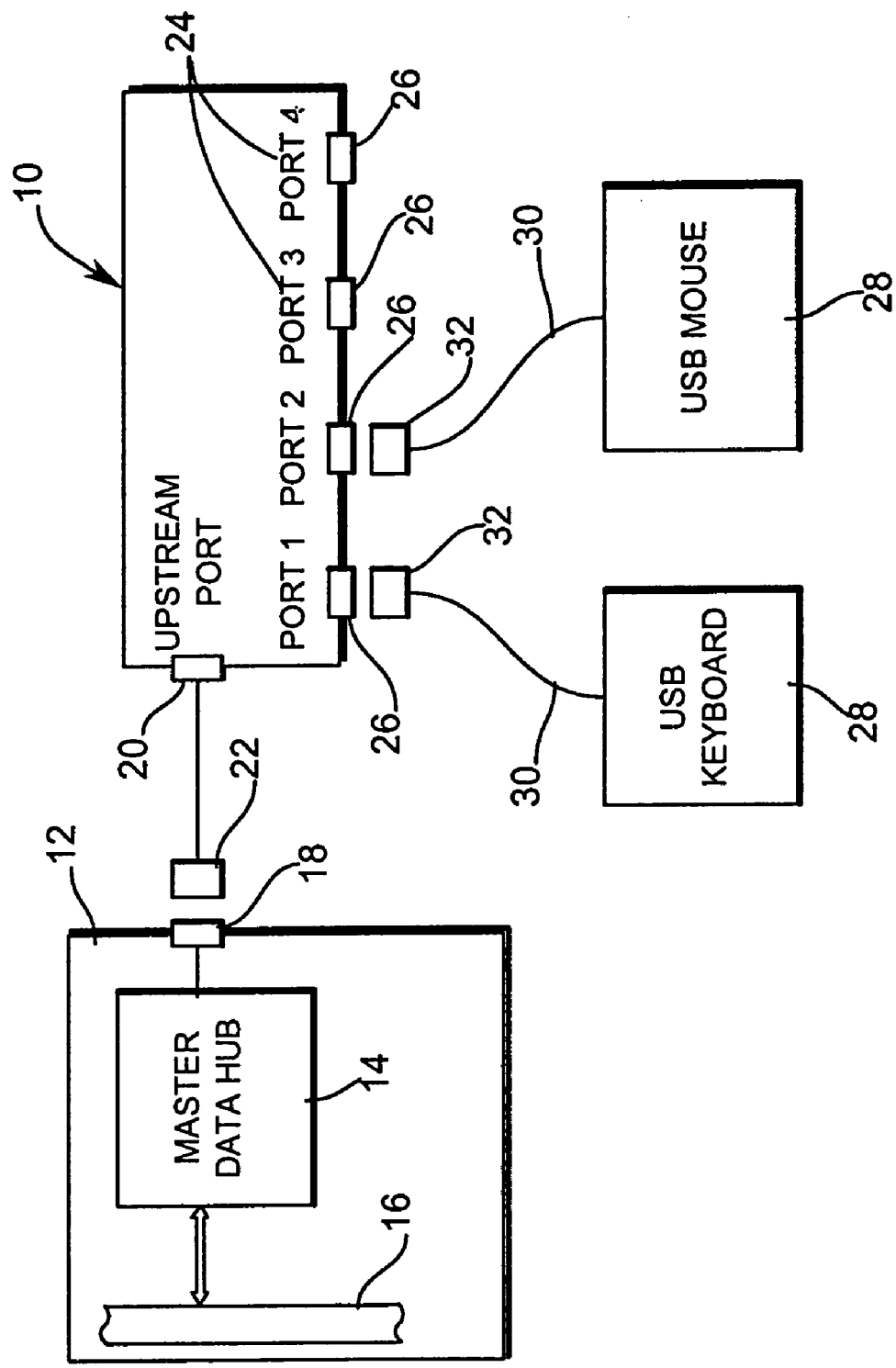
FIG. 1 is a block diagram of illustrating the use of a conventional universal serial bus.

Referring to FIG. 1, a block diagram illustrating the connection of a known USB hub 10 to a computer 12 is shown. The computer 12 has a USB interface which includes a master data hub 14 for receiving data from the USB hub. The master data hub 14 is coupled to the computer 12 via an internal bus 16 which provides a communication path between the master data hub and the computer. The master data hub 14 includes at least one USB connector 18. The USB hub 10 includes an upstream port 20 having a corresponding USB plug 22 which connects to the USB connector 18 of the master data hub 14.

The USB hub 10 also includes a plurality of downstream ports 24 having USB connectors 26 to permit multiple peripheral devices 28 to be coupled to the master data hub 14 through the USB hub 10. Each of the peripheral devices 28 is connected to the USB hub 10 by a connection cable 30 having a USB connector 32 which mates with the USB hub downstream port connectors 26.

Figure 2:
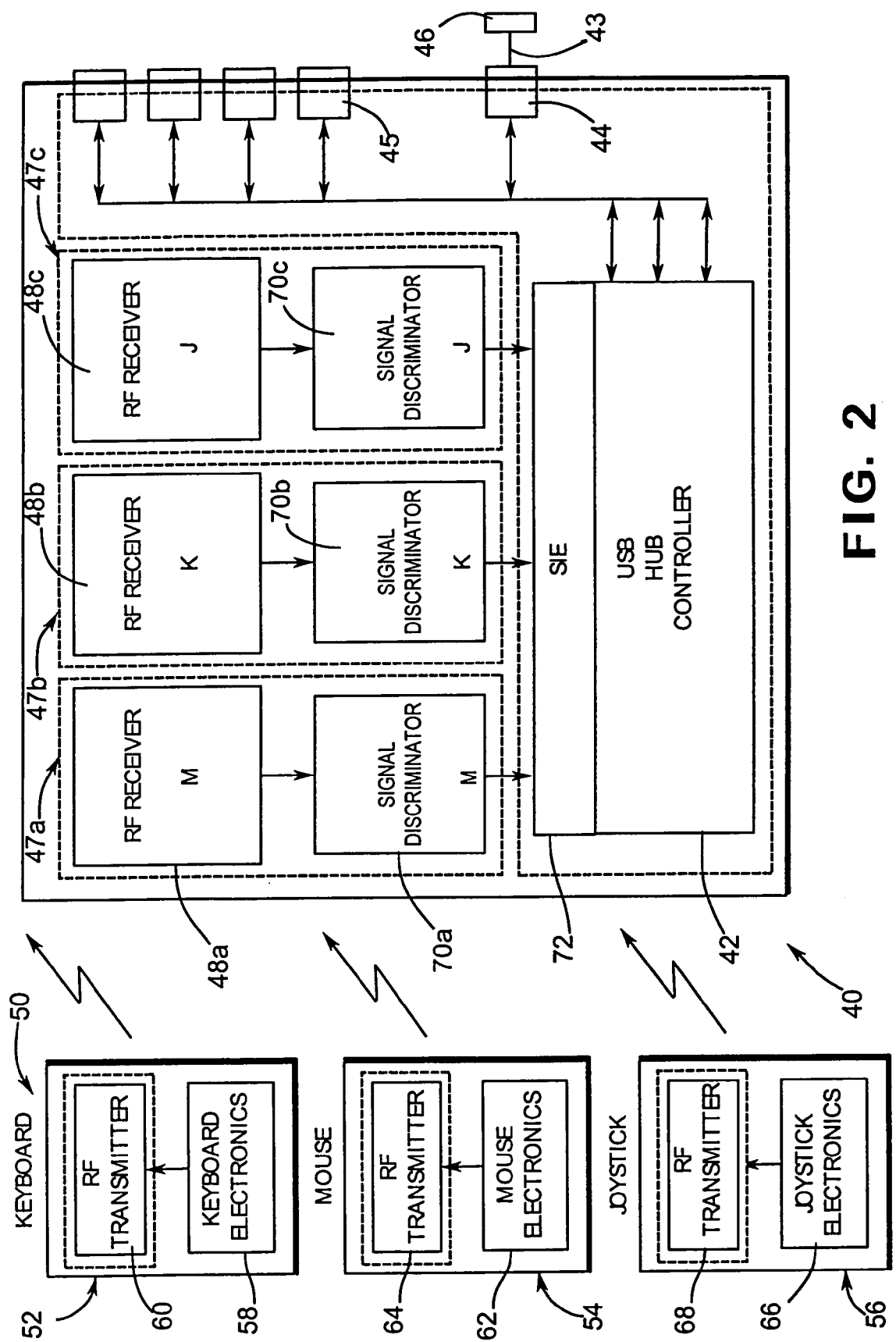
FIG. 2 is a block diagram of a wireless universal serial bus hub of the present invention.

Referring now to FIG. 2, a block diagram of a wireless USB hub shown generally at 40 for providing wireless communication to a plurality of peripheral devices is provided. The wireless USB hub 40 includes a hub controller 42 which is known in the art and shall be described in greater detail below.

The wireless USB hub 40 further includes an upstream port 44 similar to the upstream port 20 of the known USB hub. The USB hub 40 includes a USB "A" connector 46 connected to the upstream port 44 by a cable 43 for connecting the USB hub to a master data hub similar to that shown in FIG. 1. The wireless USB hub 40 also includes a plurality of optional conventional downstream USB ports 45.

The wireless USB hub 40 also includes three separate data reception circuits 47a, 47b, and 47c. Each data reception circuit 47a-47c preferably includes a separate radio frequency (RF) receiver 48a, 48b, 48c, forming a separate receiver channel. Each receiver receives RF signals transmitted in a suitable wireless manner from a corresponding remote wireless peripheral device 50. The RF receivers 48a-48c are conventional and constructed using standard parts as shall be described in further detail below. Any suitable transmission/reception format may be used including single or multi-channel RF or spread spectrum such as 900 MHZ or 2.4 GHz technology.

A plurality of wireless peripheral devices 50 for communicating with the wireless USB hub are shown, including a wireless keyboard 52, wireless mouse 54 and wireless joystick 56. The wireless keyboard 52 includes conventional keyboard electronics 58 and a conventional RF transmitter 60 for transmitting information from the keyboard electronics to the corresponding RF receiver 48a of the data reception circuit 47a. The wireless mouse 54 includes conventional mouse electronics 62 and a conventional RF transmitter 64 for transmitting information from the mouse electronics to the corresponding receiver 48b of the data reception circuit 47b. The wireless joystick 56 includes conventional joystick electronics 66 and a conventional RF transmitter 68 for transmitting information from the mouse electronics to the corresponding receiver 48c of the data reception circuit 47c. Any other suitable known wireless peripheral device may also be used. In the present embodiment, the data from the wireless peripheral devices 50 is transmitted to the USB hub 42 on individual radio frequency channels each of which is received by the corresponding RF receiver 48a-48c.

Each data reception circuit 47a, 47b, and 47c also preferably includes a separate signal discriminator 70a, 70b, and 70c, each connected to the corresponding receiver 48a, 48b, and 48c for receiving the information sent by the transmitter 60, 64, and 68 of the corresponding wireless peripheral device 52, 54, 56. The signal discriminators 70a-70c are connected to a single serial interface engine 72, which is preferably included in the hub controller chip 42, although it may be a separate circuit component.

The receiver 48a-48c provides the corresponding signal discriminator 70a-70c with information received from the peripheral device including a ttl serial data packet having a number of data bytes and associated chucksum all of which are standard in this type of data transmission and well known in the art. The signal discriminator 70a-70c uses a microcontroller which shall be described in further detail below to interrogate the incoming data packet for validity by verifying the proper packet size and checksum per byte. The signal discriminator 70a-70c then strips the data packet to present only the peripheral device data bytes to the hub controller 42. The signal discriminator 70a-70c also passes command codes on to the hub controller firmware.

The hub controller 42 of the present embodiment further includes a serial interface engine 72, preferably a programmable microcontroller, which is known in the art. The data packet from the signal discriminator 70a-70c is sent to the appropriate serial interface engine port corresponding to the source of the data. The serial interface engine 72 converts the data into USB compatible information for the specific peripheral device and transmits it via the hub controller 42 to the USB upstream port 44 and to the computer 12 via the cable 43 and connector 46.

The present embodiment enables a serial interface engine 72 having processing capability to be used. The signal discriminators 70a-70c will typically process the data before it is introduced to the USB hub controller 42. This embodiment can process more complex peripheral device data streams providing good flexibility for handling complex peripheral devices.

Figure 3:
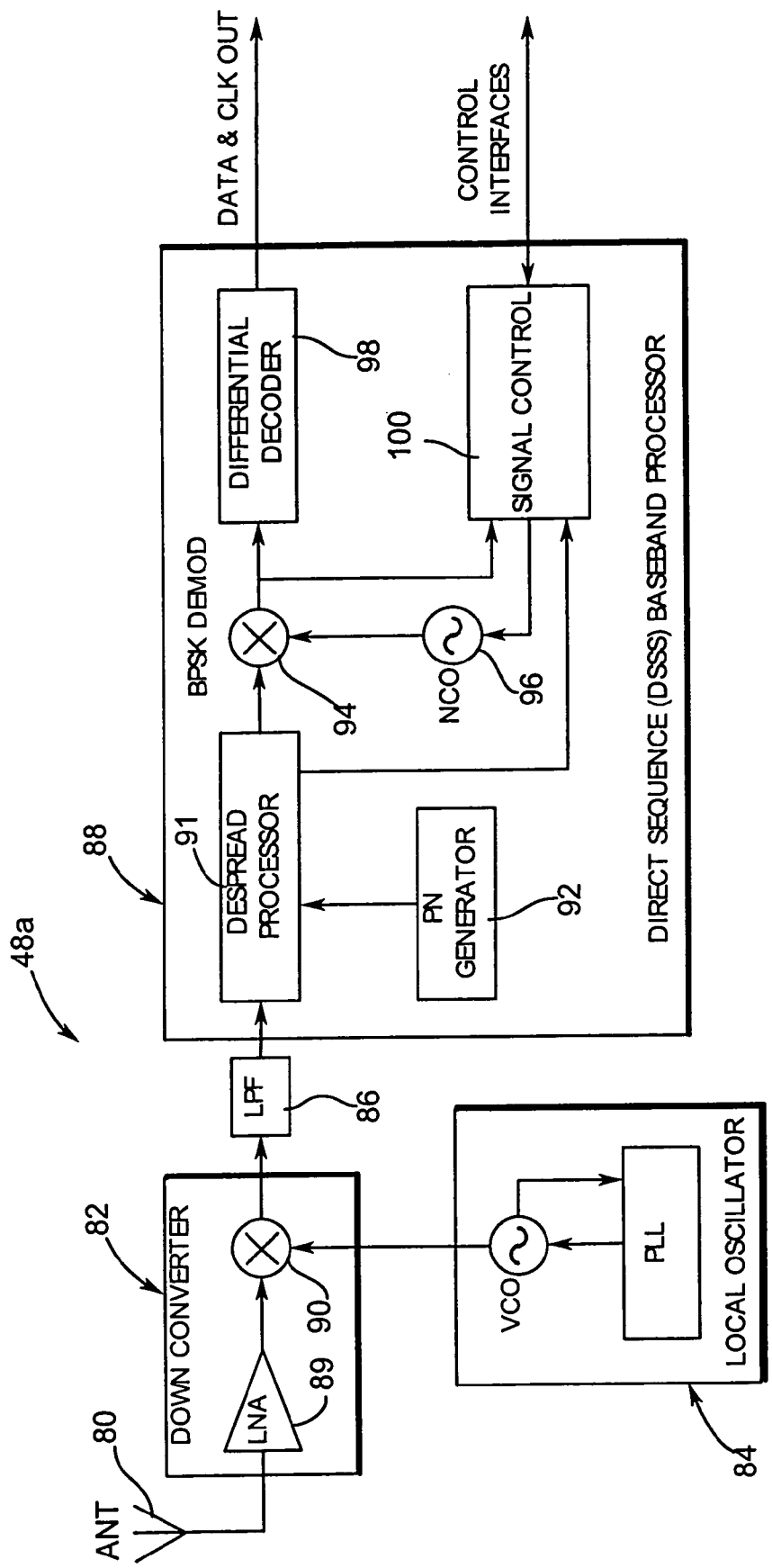
FIG. 3 is a block diagram of an RF receiver for use in the wireless universal serial bus hub according to the invention.

The data reception circuits 47a-47c described above are all similar, and only one, 47a shall be described in further detail. Referring to FIG. 3, a block diagram of the RF receiver in the data reception circuit 47a is shown generally as 48a. The RF receiver 48a is a conventional DSSS BPSK modulation receiver which is known in the art. The receiver 48a includes an antenna 80, a conventional down converter 82 and local oscillator 84, a low pass filter 86 and demodulator 88. The down converter is conventional and includes a low noise amplifier 89 and mixer 90. The spread spectrum RF signals received by the antenna 80 are amplified by the low noise amplifier 89. The amplified signal is mixed with the local oscillator 84 signal to produce an IF which is filtered by the low pass filter 86.

The resulting baseband signal is then demodulated by the demodulator which is preferably a Direct Sequence DSSS Baseband Processor 88 in a known manner to provide the peripheral data to the signal discriminator 70a via the data & clock out signal path. The baseband processor 88 includes a de-spread processor 91, a pseudo-noise generator 92, a BPSK demodulator 94, a numeric controlled oscillator 96, a differential decoder 98 and a signal control unit 100. The baseband signal from the low pass filter 86 is de-spread and recovered to a correlated signal. The de-spread processor 91 is controlled by the pseudo-noise generator 92 in a known manner. The BPSK demodulator 94 tracks and removes the carrier frequency offset and outputs the differential encoded signal to the differential decoder 98. The numeric controlled oscillator 96 provides a tracked carrier frequency for the BPSK demodulator 94. The differential encoded signal is decoded by the differential decoder 98 to output the data signal and clock signal. The signal control unit 100 is responsible for all the controls inside the baseband processor 88 and the communication with the outside microcontroller 42 through the control interface.

Figure 4A:
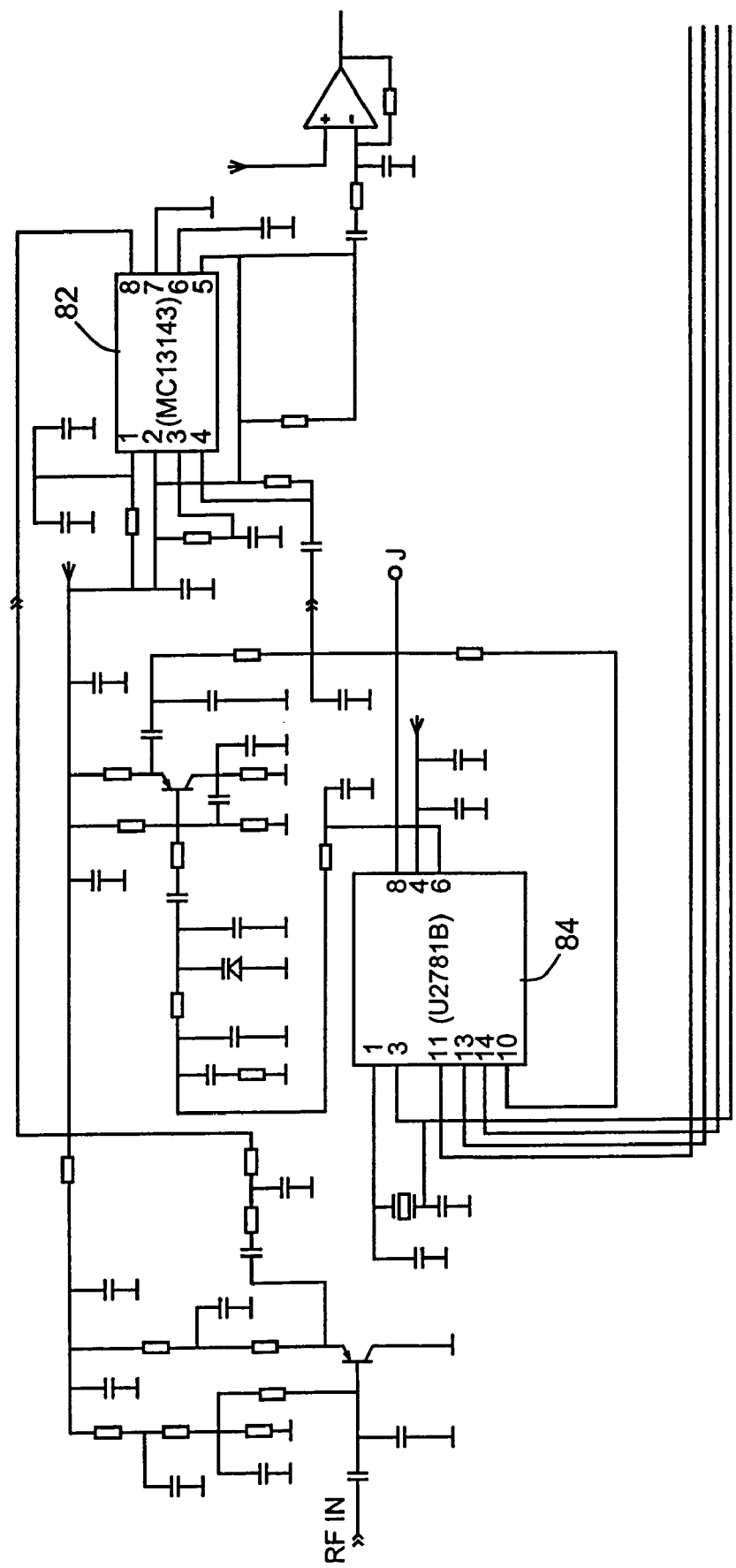
FIG. 4a is a schematic diagram of first portion of the data reception circuit according to the invention.
Figure 4B:
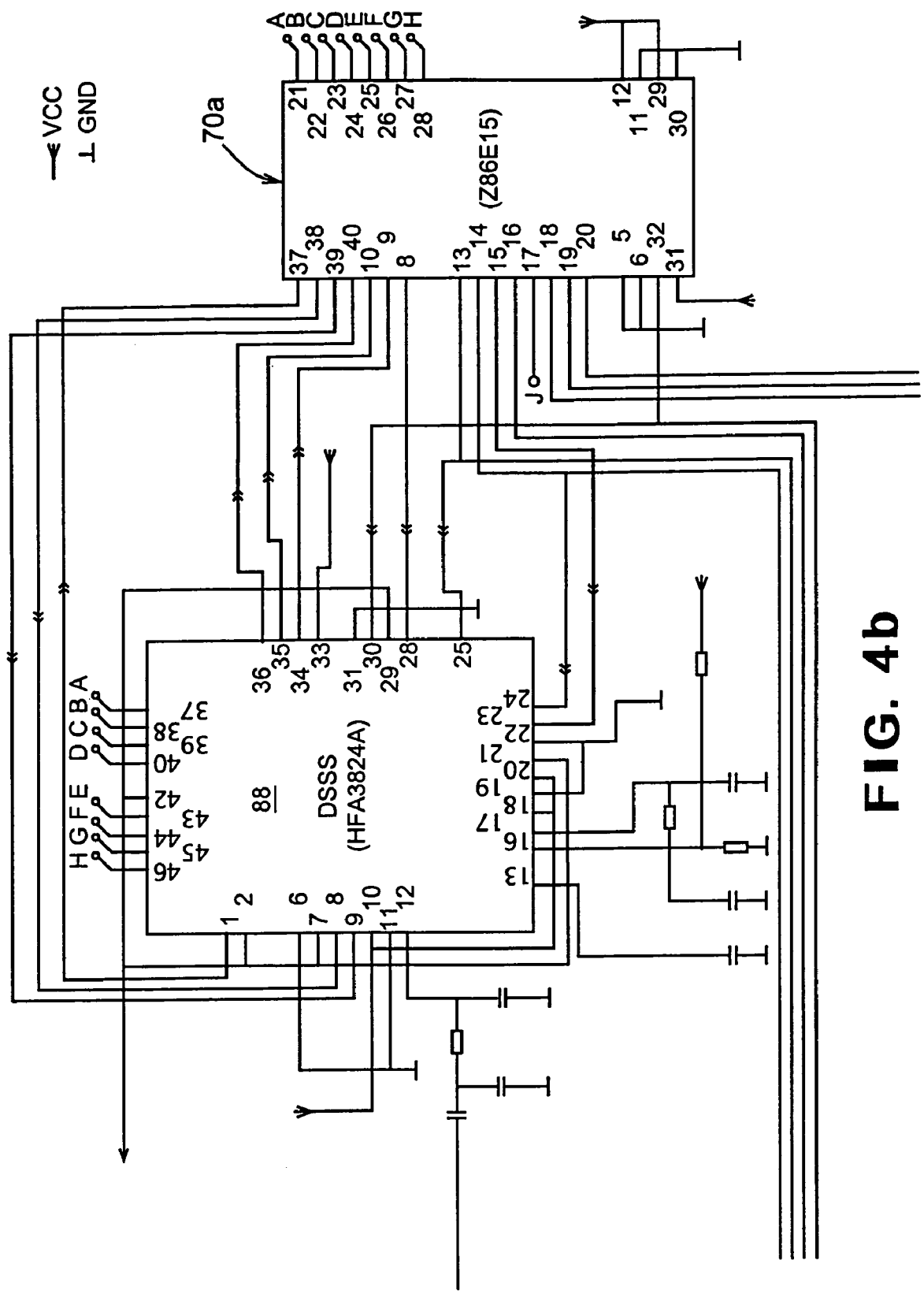
FIG. 4b is a schematic diagram of second portion of the data reception circuit according to the invention.

Referring now to FIGS. 4a and 4b, schematic representations of the data reception circuit 47a is shown. The downconverter 82 preferably uses a 2.4 GHz Linear Mixer, such as the MC13143 IC chip made by Motorola, in a known manner to provide the downconverter circuit 82, although any suitable known circuit may be used. The MC13143 chip is connected in the circuit using the chip pin numbers as shown in the schematic. The local oscillator 84 preferably uses a frequency synthesizer IC chip, such as the U2781B chip from Telefunken Semiconductors of Heilbronn Germany, in a known manner to provide the local oscillator signal to the downconverter, although any suitable known circuit may be used. The U2781B chip is connected in the circuit using the chip pin numbers as shown in the schematic.

The resulting baseband signal is then demodulated by the Direct Sequence DSSS Baseband Processor 88 in a known manner. The Direct Sequence DSSS Baseband Processor is preferably an IC chip HFA3824A manufactured by Harris Semiconductor, although any suitable demodulation chip may be used.

The demodulated output is sent to the signal discriminator 70a described above. A known keyboard controller chip, such as Z86E15 made by Zilog Inc. of Campbell Calif., is used for the signal discriminator microcontroller. The Z86E15 is connected in the circuit using the chip pin numbers as shown in the schematic. Alternatively, any suitable known general purpose microcontroller with sufficient I/O, speed and ROM may be used to handle the discrimination and routing of the data signals in the known manner described above.

Figure 5:
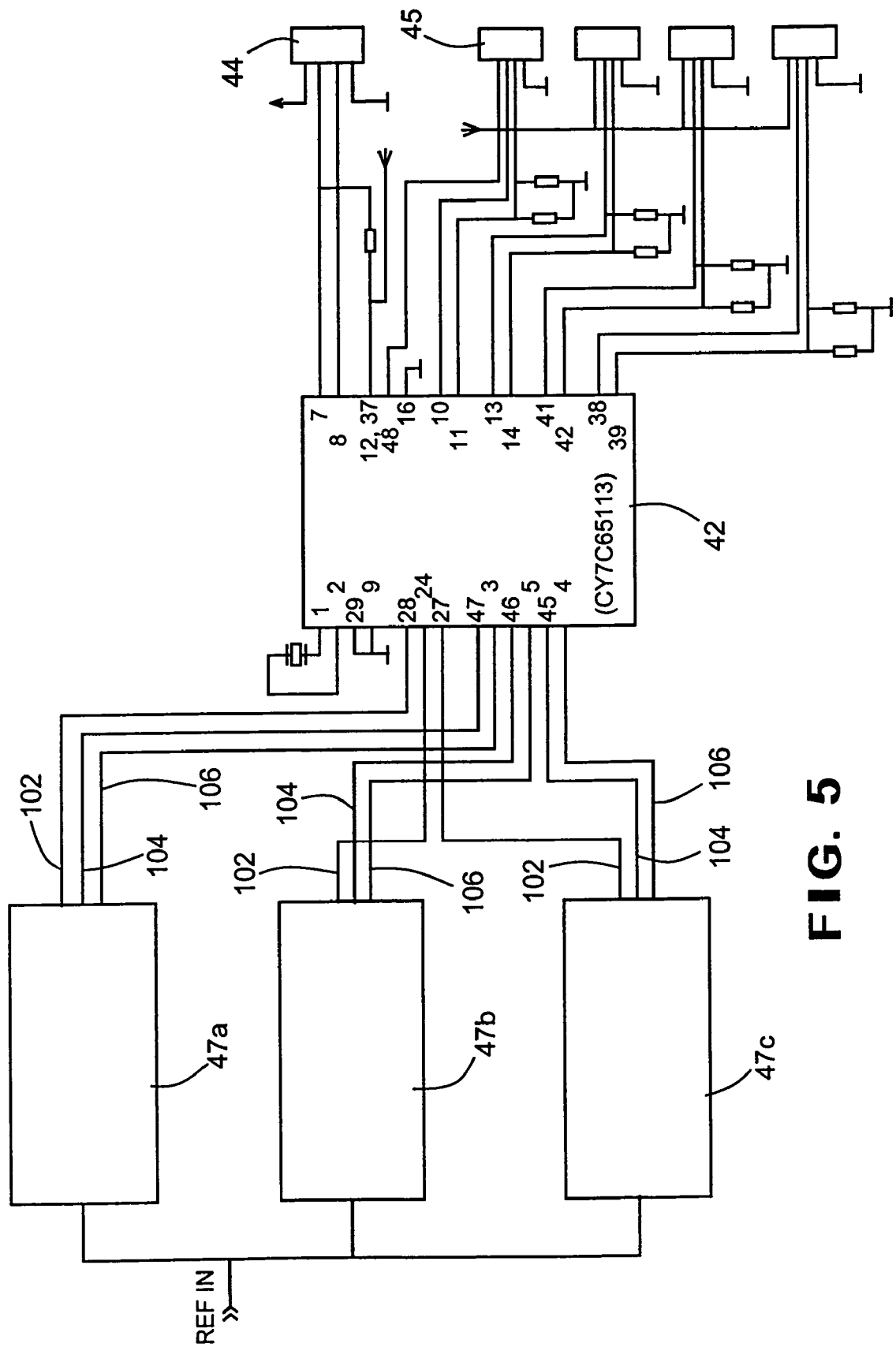
FIG. 5 is a schematic diagram of the wireless universal serial bus hub according to the invention.

Referring now to FIG. 5, a schematic diagram of the entire wireless USB hub is shown, including the three data reception circuits 47a, 47b, and 47c described above, and the hub controller 42. The hub controller 42 is preferably the CY7C65113 hub controller chip made by Cypress Semiconductor Corporation of San Jose Calif. previously used in prior art USB hubs shown in FIG. 1, although any suitable known hub controller may be used. The data reception circuits 47a-47c are connected to the hub controller using the CY7C65113 chip pin numbers as shown in the schematic. Each data reception circuit 47 provides the data information from the signal discriminator 70 to the hub controller 42 via a data signal path 102. Each reception circuit 47a-47c further communicates with the hub controller 42 via a clock signal path 104 and an enable signal path 106 to control the data reception circuit in a known manner.

Figure 6:
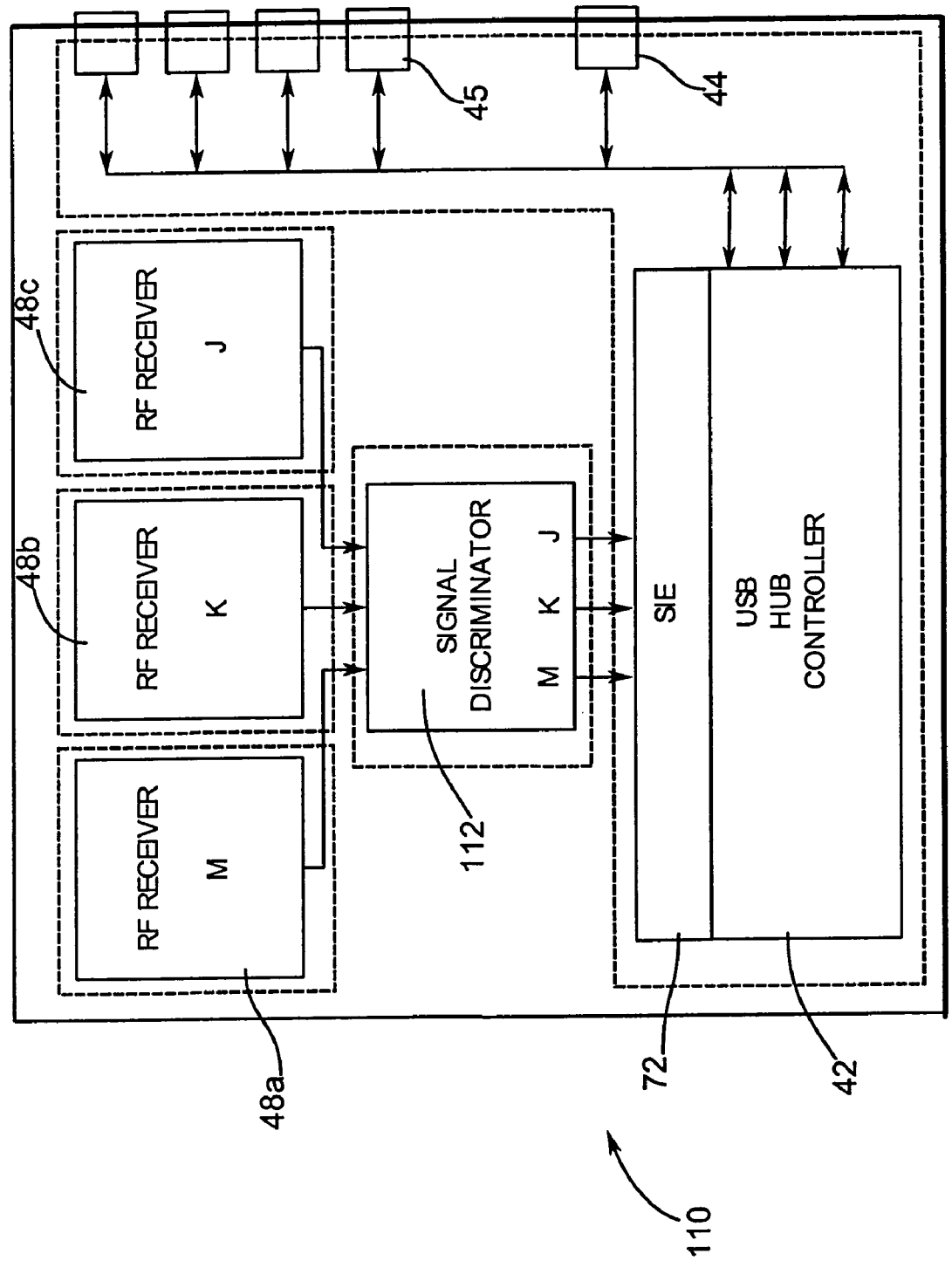
FIG. 6 is a block diagram of an alternate embodiment of the wireless universal serial bus hub according to the invention.

Referring now to FIG. 6, an alternate embodiment of the wireless USB hub is shown generally at 110. The wireless USB hub 110 is similar to the preferred embodiment 40 described above with similar components using the same reference numerals. The wireless USB hub 110 includes three separate radio frequency (RF) receivers 48a, 48b, 48c, forming three separate receiver channels as described above. However, the wireless USB hub 110 includes a single signal discriminator 112, receiving the output from all three receivers 48a-48c.

The receivers 48a-48c provide the signal discriminator 112 with a ttl serial data packet including a number of data bytes and associated chucksum all of which are standard in this type of data transmission and well known in the art. The data packet also contains an ID number which indicates which device is transmitting the data. The signal discriminator 112 interrogates the incoming data packet as described above determining which type of peripheral sent the data. The data is translated and routed to the appropriate port on the USB hub controller's serial interface engine 72. The serial interface engine 72 converts this data into USB compatible information for that specific device.

Figure 7:
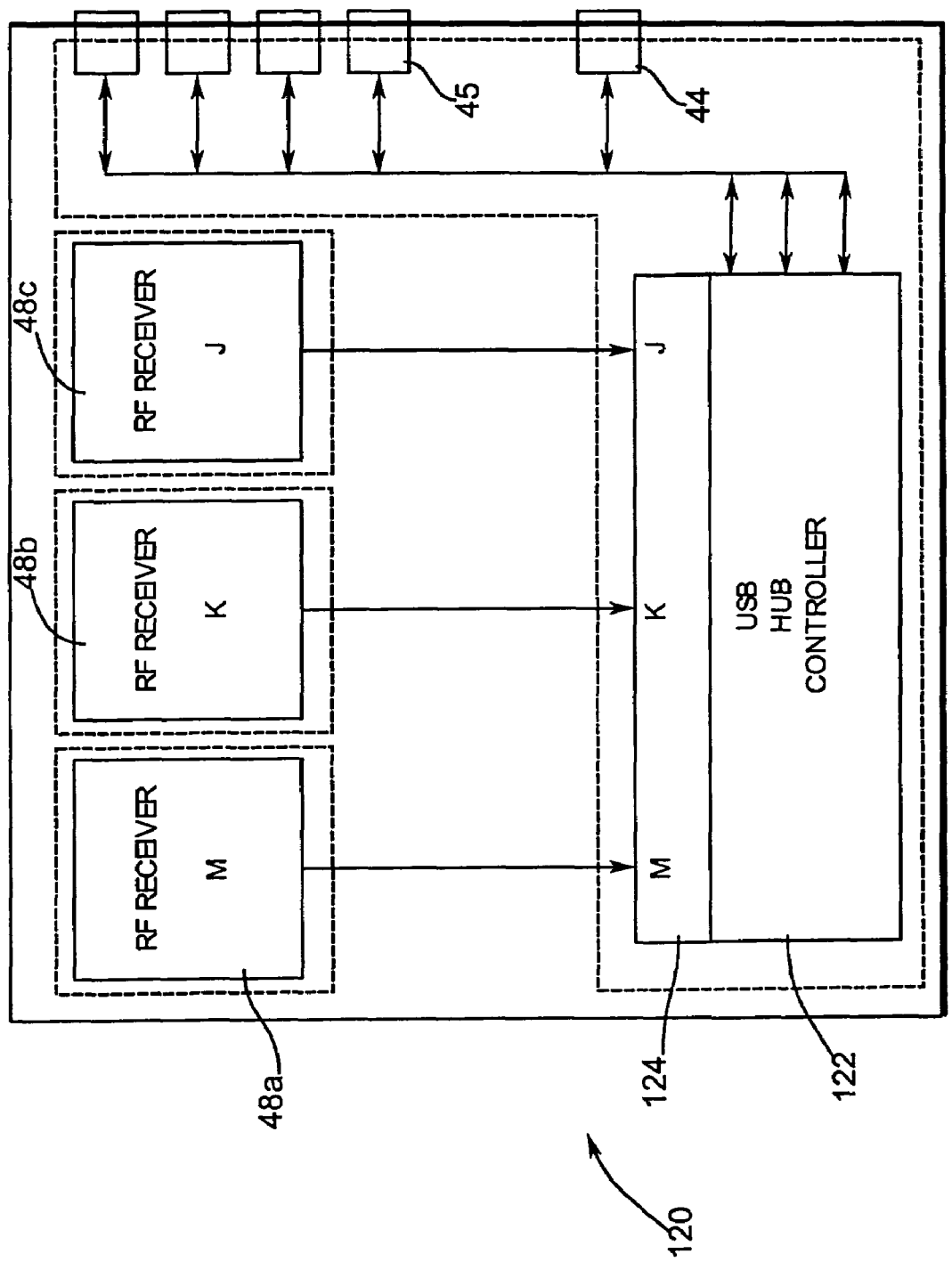
FIG. 7 is a block diagram of a second embodiment of the wireless universal serial bus hub according to the invention.

Referring now to FIG. 7, a second alternate embodiment of the wireless USB hub is shown generally at 120. This USB hub 120 uses three different RF receivers 48a, 48b, 48c as described above and a USB hub controller 122 having a serial interface engine 124 which has enough speed, memory and ROM space to perform the functions of the signal discriminators 70a, 70b, and 70c described above. This embodiment is generally more cost effective, but may have performance limitations for peripherals that require large amounts of data transfers and long data transmissions. This embodiment is suitable for applications having a single wireless peripheral device such as only a wireless keyboard.

Figure 8:
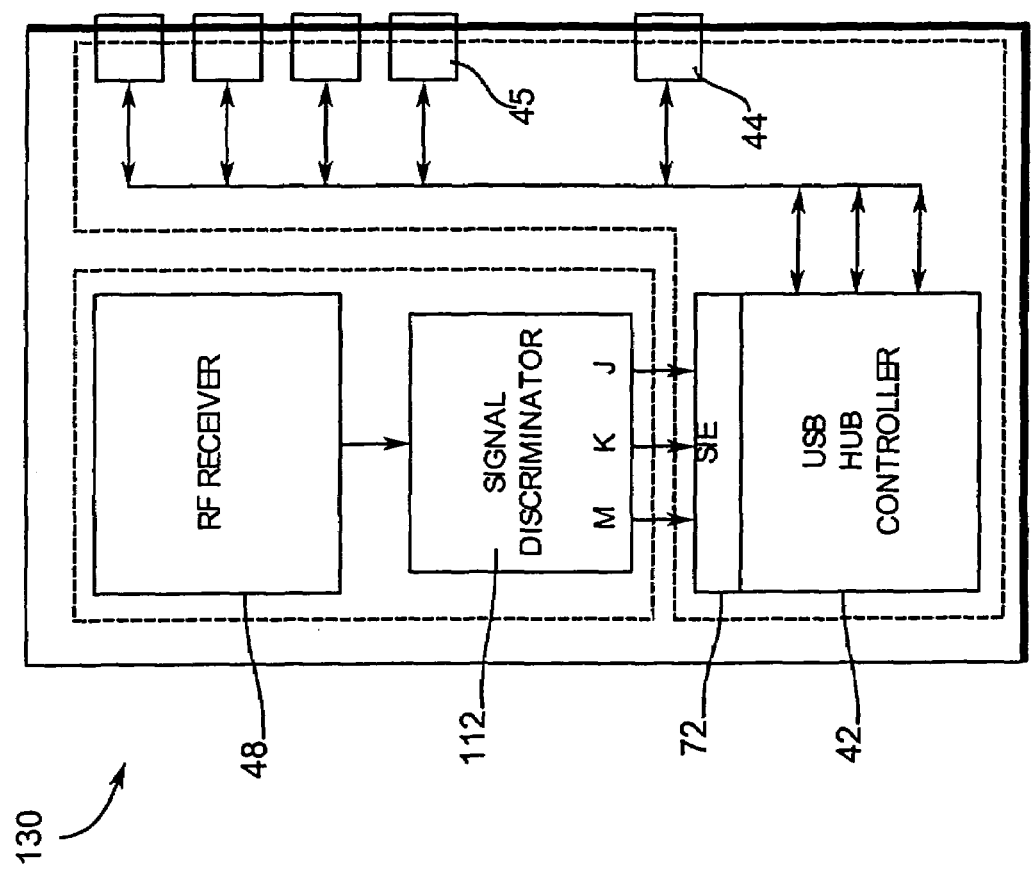
FIG. 8 is a block diagram of a third embodiment of the wireless universal serial bus hub according to the invention.

Referring now to FIG. 8, a third embodiment of the wireless USB hub is shown generally at 130. The wireless USB hub 130 of this embodiment includes a single channel RF receiver 48 and a single signal discriminator 112. The data from the wireless peripheral devices 52, 54, 56 is transmitted to the USB hub 130 on a single radio frequency which is received by the RF receiver 48. The data contains an ID number which indicates which device is transmitting the data. The data byte also includes a checksum nibble or by used to insure the data byte is valid as described above. The receiver 48 produces a ttl serial data packet including an ID byte for indicating which device is transmitting the data, a number of data bytes and associated chucksum as described above. The ttl serial data packet is sent to the signal discriminator 112 which uses a microcontroller as described to interrogate the incoming data packet for validity by verifying the proper packet size and checksum per byte. The signal discriminator 112 also determines which peripheral device transmitted the data using the ID byte. The signal discriminator 112 then strips the data packet to present only the peripheral device data bytes to the hub controller 42.

The hub controller 42 includes the serial interface engine 72 as described above. The data packet is sent to the appropriate serial interface engine port (shown as M, K, or J) corresponding to the source of the data. The serial interface engine 72 converts the data into USB compatible information for the specific peripheral device which is then transmitted to the upstream port 44. A wireless USB hub 130 having a single RF receiver provides the advantage of a simple hardware design.

Figure 9:
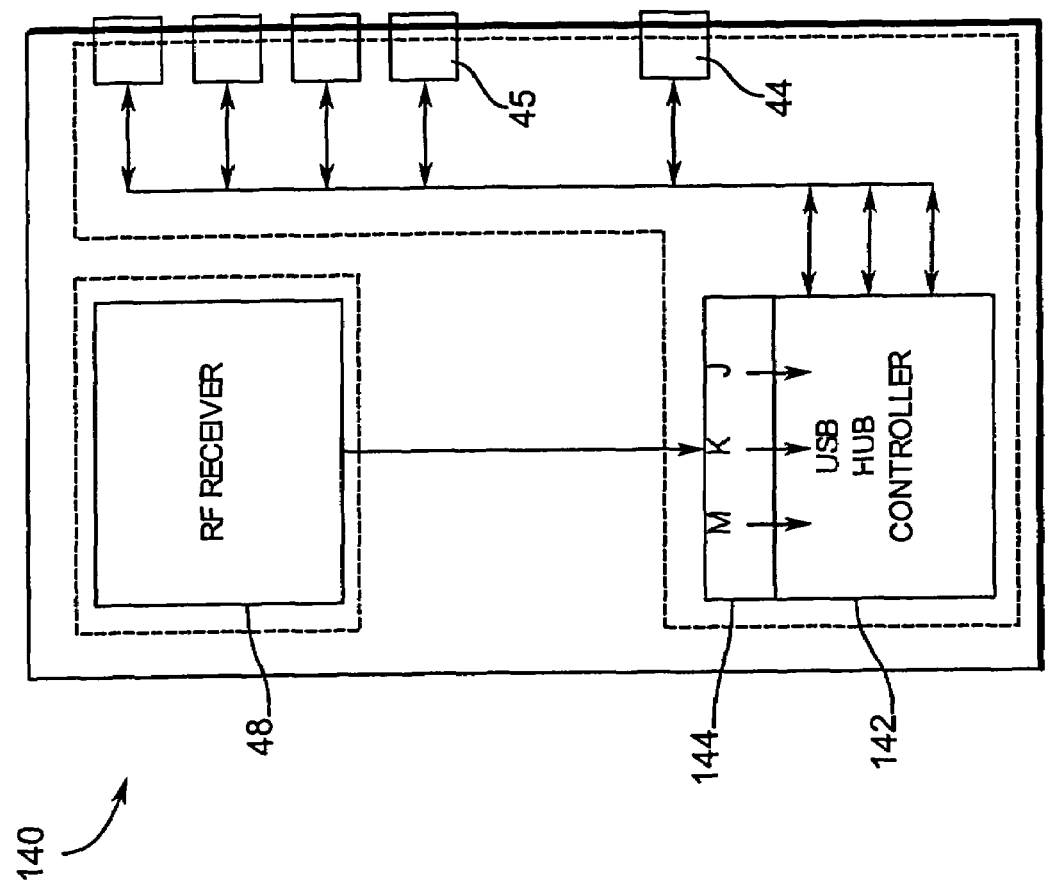
FIG. 9 is a block diagram of a third embodiment of the wireless universal serial bus hub according to the invention.

Referring to FIG. 9, a third alternate embodiment of the wireless USB hub is shown generally at 140. The wireless USB hub 140 includes a single RF receiver 48, and a USB hub controller 142 having a serial interface engine 144 which has enough speed, memory and ROM space to perform the functions of the discriminator 112 described above.

Figure 10:
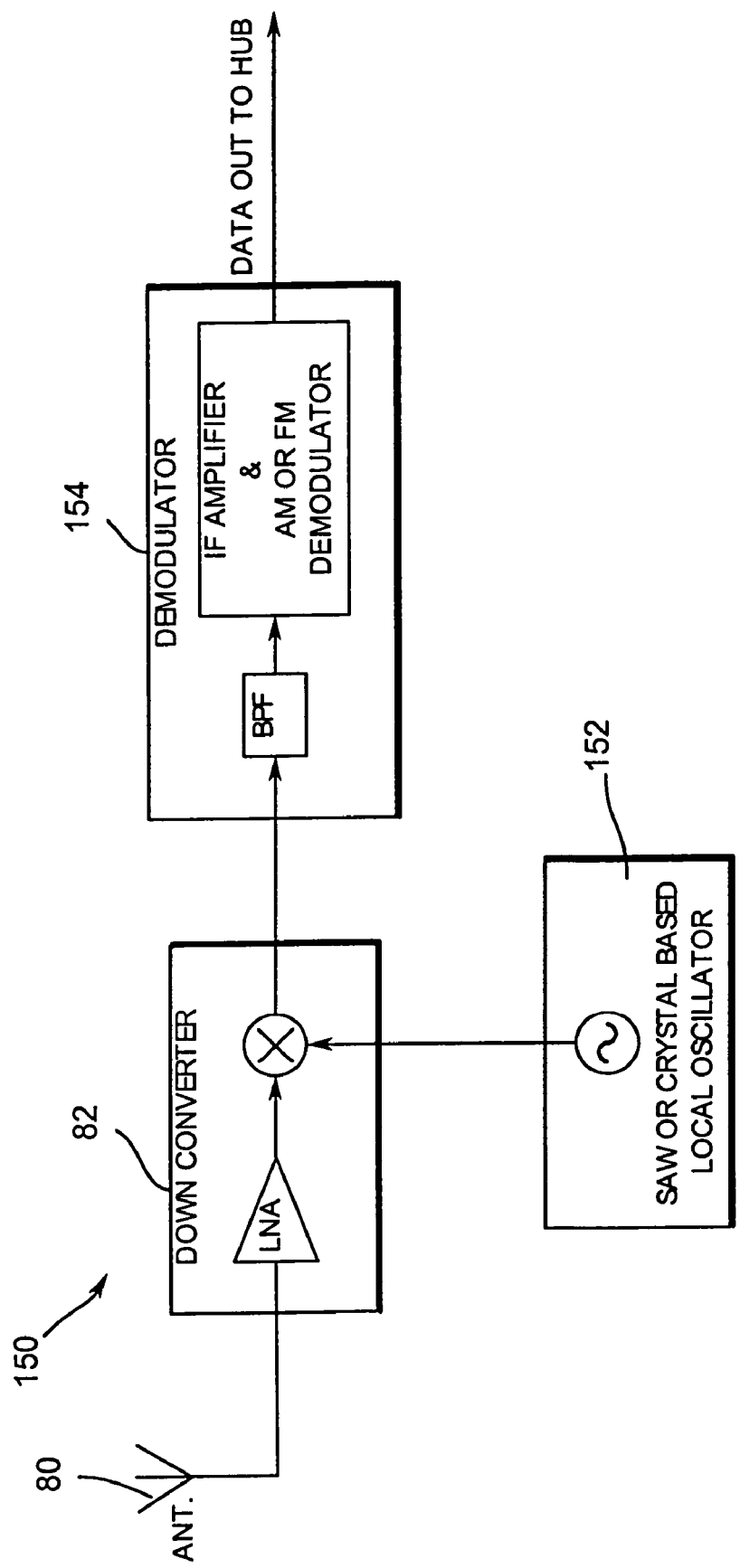
FIG. 10 is a block diagram of an alternate embodiment of the RF receiver for use in the present invention.

Referring to FIG. 10, an alternate embodiment of the RF receiver 48 described above is shown generally at 150. The RF receiver 150 is similar to the receiver 48a described above and includes many similar components which are labeled with similar reference numerals. The receiver 150 includes a conventional local oscillator 152 formed from a SAW or crystal in a known manner. The output from the downconverter 82 is provided to a demodulator 154. The demodulator is conventional and includes a known bandpass filter 156 and a known demodulator including a conventional IF amplifier and a conventional AM or FM demodulator.

Figure 11:
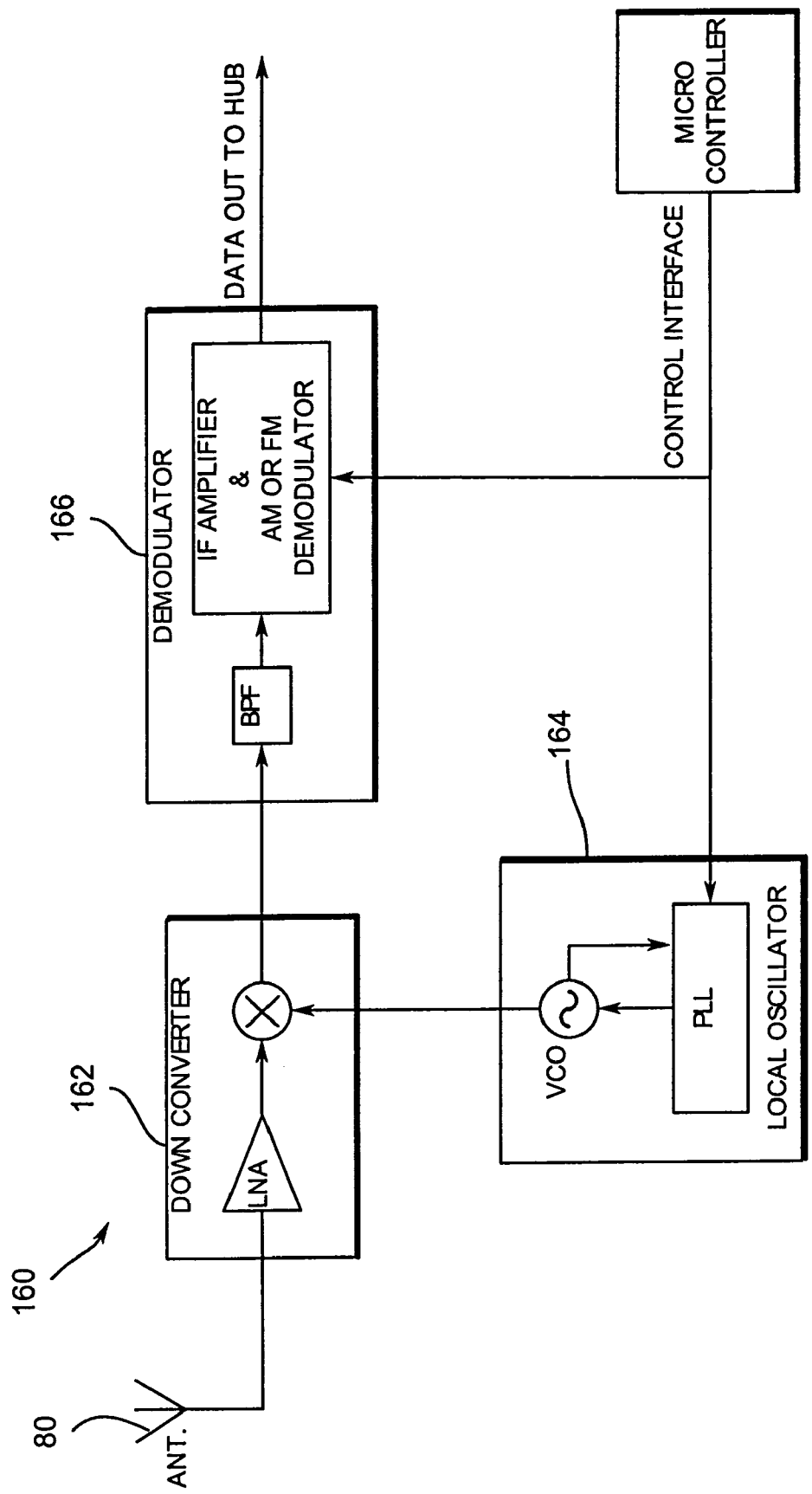
FIG. 11 is a block diagram of a second embodiment of the RF receiver for use in the present invention.

Referring now to FIG. 11, an alternate embodiment of the RF receiver 48 described above is shown generally at 160. The RF receiver 160 is a multichannel receiver which can be used as the RF receiver 48 described above. The receiver 160 includes a conventional down converter 162, a conventional local oscillator 164 and a conventional demodulator 166. The local oscillator includes a voltage controlled oscillator and a programmable phase locked loop circuit. The frequency of the local oscillator can be controlled by a microcontroller through the control interface. The multichannel receiver can change its RF channel to avoid the radio interference in a certain channel. In addition, it can be used as a spread spectrum technology, for frequency hopping which is known in the art.

Figure 12:
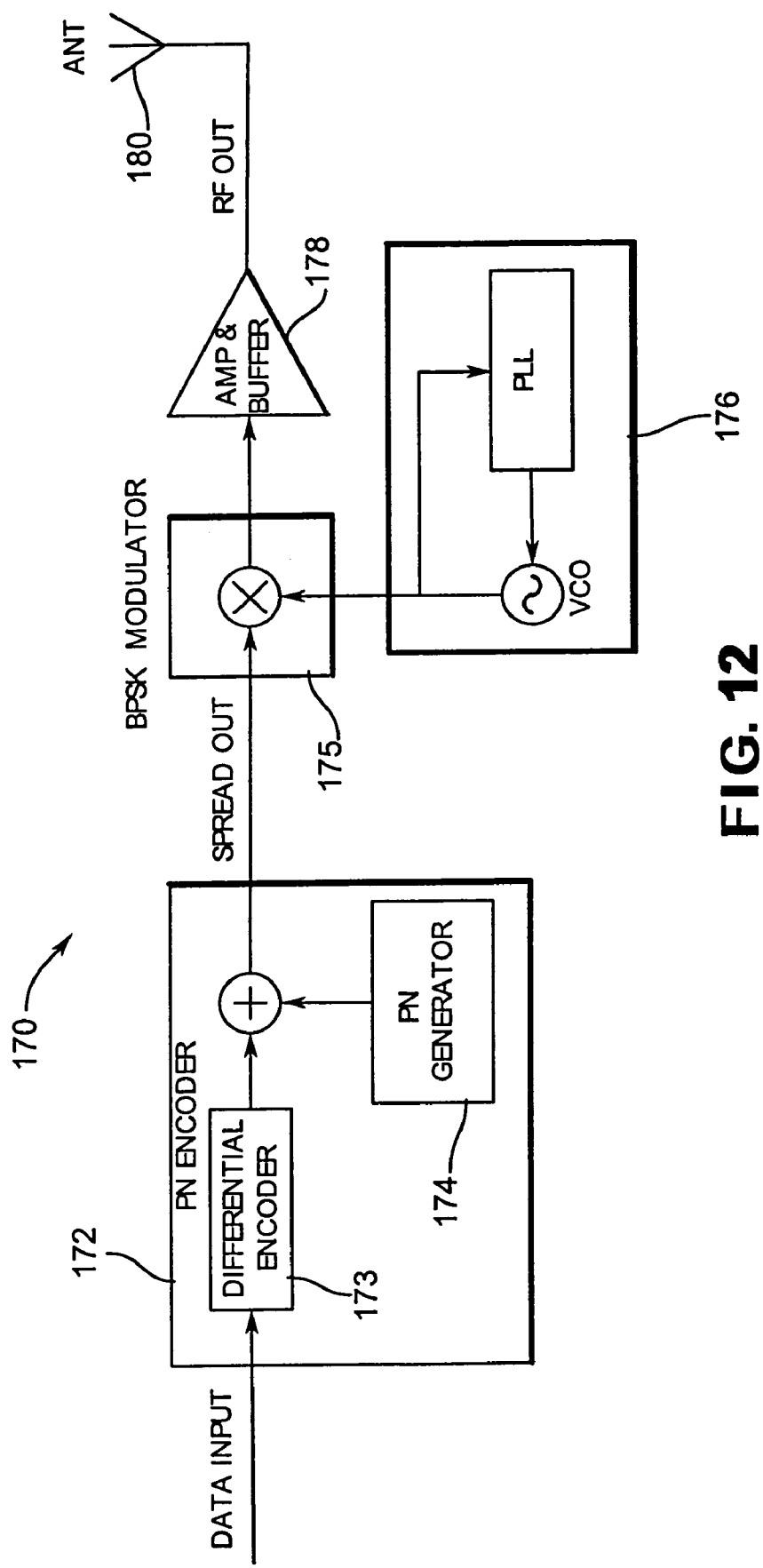
FIG. 12 is a block diagram of an RF transmitter for use in the present invention.

Referring now to FIG. 12, a block diagram of an RF transmitter is shown generally at 170. The RF transmitter 170 can be used as the RF transmitter 52, 64, and 68 of the respective wireless peripheral device 52, 54, 56 described above. The transmitter 170 is a conventional spread spectrum transmitter which is known in the art and includes a conventional pseudo noise encoder 172 having a conventional differential encoder 173 and a conventional pseudo noise generator 174. The transmitter further includes a conventional BPSK modulator 175, a conventional local oscillator 176, an amplifier 178 and an antenna 180. The data from the peripheral electronics 58, 62, 66 is encoded into a differential signal and spread with the signal from the pseudo noise generator 174. The spread data from the pseudo noise encoder 172 is then modulated into an RF signal which is determined by the local oscillator 176. The modulated RF signal is finally amplified by the buffer and amplifier 178 to be fed into the antenna 180 for transmission to the RF receiver 48.

Figure 13:
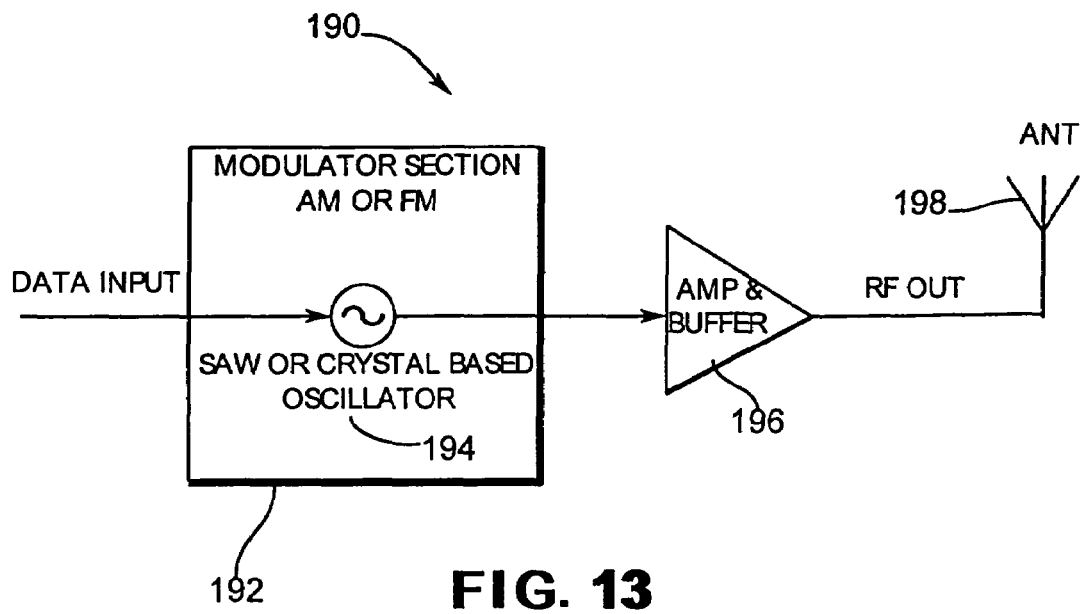
FIG. 13 is a block diagram of an alternate embodiment of the RF transmitter for use in the present invention.

Referring now to FIG. 13, a block diagram of an alternate embodiment of the RF transmitter 170 described above is shown generally at 190. The RF transmitter 190 is a single channel transmitter having a modulator section 190 including a SAW or crystal based oscillator 194 which is modulated by the data signal from the peripheral electronics 58, 62, 66. The modulated RF signal is amplified by a conventional buffer and amplifier 196 and provided to the antenna 198 for transmission to the receiver 48 described above.

Figure 14:
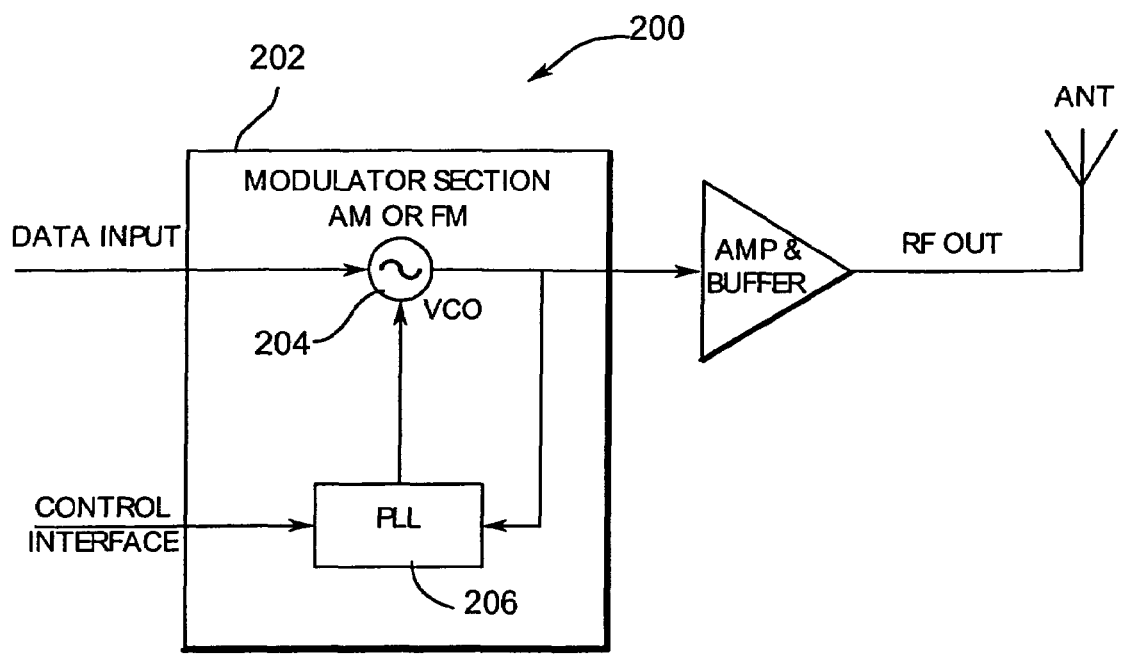
FIG. 14 is a block diagram of a second embodiment of the RF transmitter for use in the present invention.

Referring now to FIG. 14, a block diagram of an alternate embodiment of the RF transmitter 170 described above is shown generally at 200. The RF transmitter 200 is a multi-channel transmitter having a modulation section 202 including a conventional voltage controlled oscillator 204 and a conventional programmable phase locked loop circuit 206. The RF frequency to be transmitted can be changed by the microcontroller of the peripheral electronics through the control interface. This embodiment of the transmitter provides more flexibility than the single channel transmitter.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A wireless system for operating a computer having a USB port comprising:
   a remote wireless Universal Serial Bus (USB) hub comprising at least one port for supporting at least one peripheral device, said USB hub having a circuit for receiving device information causing associated operations to be performed by the computer and a wireless transmitter connected to said circuit for transmitting a wireless signal including said device information, said circuit and said wireless transmitter being integral to said USB hub, said wireless transmitter being the sole means for communicating said device information from said at least one peripheral device through said USB hub, wherein said associated operations are not triggered by wireless telephony and said at least one peripheral device not having any direct USB communication with the computer, said at least one peripheral device being one of a keyboard, a mouse, and a joystick; and
   a dongle including an upstream USB port adapted to be connected to the computer, said dongle including a hub controller connected between said data reception circuit and said upstream USB port whereby when said upstream USB port is connected to the USB port of the computer and said at least one peripheral device generates said wireless signal to said controller through said wireless USB hub, said dongle converts said wireless signal to a USB data signal and passes said USB data signal to said upstream port for causing the associated operations to be performed by the computer.

2. The wireless system according to claim 1 wherein there are two peripheral devices, each said peripheral device having a circuit for generating device information causing associated operations to be performed by the computer and a transmitter connected to said circuit for transmitting a signal including said device information to said USB hub, said wireless transmitter of said USB hub being the sole means for communicating said device information from said peripheral device and said peripheral device not having any direct communication with the computer, wherein said associated operations are not triggered by wireless telephony and said dongle controller having means to distinguish between each of said two peripheral devices.

3. A wireless system for operating a computer having a USB port comprising:
   a remote wireless Universal Serial Bus (USB) hub comprising at least one port for supporting at least one peripheral device, said USB hub having a circuit for receiving said at least one peripheral device information causing associated operations to be performed by the computer and a wireless transmitter connected to said circuit for transmitting a wireless signal including said at least one peripheral device information, said circuit and said wireless transmitter being integral to said USB hub, said wireless transmitter being the sole means for communicating said at least one peripheral device information from said at least one peripheral device to the computer, wherein said associated operations are not triggered by wireless telephony and said at least one peripheral device not having any direct USB communication with the computer; and
   a dongle including an upstream USB port adapted to be connected to the computer, said dongle including a controller connected between said data reception circuit and said upstream USB port whereby when said upstream USB port is connected to the USB port of the computer and said at least one peripheral device generates said wireless signal to said dongle through said wireless USB hub, said dongle converts said wireless signal to a USB data signal and passes said USB data signal to said upstream port for causing the associated operations to be performed by the computer.

4. The wireless system according to claim 3 wherein said dongle further includes a wireless receiver for receiving said wireless signal from said USB hub.

5. The wireless system according to claim 4 wherein said controller of said dongle further includes a signal discriminator connected between said wireless receiver and said hub controller for receiving said wireless signal from said wireless receiver and presenting said device information in said wireless signal to said controller.

6. The wireless system according to claim 5 wherein said controller further includes a serial interface engine connected to said signal discriminator for converting said device information into USB format to form said USB data signal.

7. The wireless system according to claim 3 further including at least two additional ports in said remote wireless USB hub for supporting at least two additional peripheral devices and including at least two additional data reception circuits, each of said data reception circuits corresponding to an associated one of said peripheral devices, wherein each of said data reception circuits includes a wireless receiver for receiving a unique wireless signal from said USB hub for each associated one of said peripheral devices.

8. A wireless system for operating a computer having a USB port comprising:
   a remote wireless Universal Serial Bus (USB) hub comprising four ports, each of said ports for supporting a peripheral device, said USB hub having a circuit for receiving said peripheral device information causing associated operations to be performed by the computer and a wireless transmitter connected to said circuit for transmitting a wireless signal including said peripheral device information, said circuit and said wireless transmitter being integral to said USB hub, said wireless transmitter being the sole means for communicating said peripheral device information from said peripheral device to the computer, wherein said associated operations are not triggered by wireless telephony and said peripheral device not having any direct USB communication capability with the computer; and a dongle including an upstream USB port adapted to be connected to the computer, said dongle including a controller connected between said data reception circuit and said upstream USB port whereby when said upstream USB port is connected to the USB port of the computer and said peripheral device generates said device information to said controller through said wireless USB hub, said dongle converts said wireless signal to a USB data signal and passes said USB data signal to said upstream port for causing the associated operations to be performed by the computer.

9. The wireless system according to claim 8 wherein said dongle further includes a wireless receiver for receiving said wireless signal from said USB hub.

10. The wireless system according to claim 9 wherein said dongle further includes a signal discriminator connected between said wireless receiver and said controller for receiving said wireless signal from said wireless receiver and presenting said device information in said wireless signal to said controller.

11. The wireless system according to claim 10 wherein said controller further includes a serial interface engine connected to said signal discriminator for converting said device information into USB format to form said USB data signal.

* * * * *

UNITED STATES PATENT AND TRADEMARK OFFICE
CERTIFICATE OF CORRECTION

| | | |
|---|---|---|
| PATENT NO. | : 7,424,560 B2 | Page 1 of 1 |
| APPLICATION NO. | : 11/337148 | |
| DATED | : September 9, 2008 | |
| INVENTOR(S) | : Henry Milan et al. | |

It is certified that error appears in the above-identified patent and that said Letters Patent is hereby corrected as shown below:

On the Title page, Item (60), please delete "Provisional application No. 60/174,442, filed on Aug. 11, 1999." and insert --Provisional application No. 60/148,442, filed on Aug. 11, 1999.--.

Signed and Sealed this
Twenty-ninth Day of January, 2013

David J. Kappos
*Director of the United States Patent and Trademark Office*